S. C. TALCOTT.

MEASURING PACKAGED FABRICS.

No. 6,829. Reissued Dec. 28, 1875.

Witnesses.

T. C. Smith

Edmund Masson

Inventor.

Samuel C. Talcott.

By Atty. A. B. Stoughton.

UNITED STATES PATENT OFFICE.

SAMUEL C. TALCOTT, OF ASHTABULA, OHIO.

IMPROVEMENT IN MEASURING PACKAGED FABRICS.

Specification forming part of Letters Patent No. 165,131, dated June 29, 1875; reissue No. 6,829, dated December 28, 1875; application filed September 30, 1875.

*To all whom it may concern:*

Be it known that I, SAMUEL C. TALCOTT, of the city and county of Ashtabula and State of Ohio, have invented a new and useful Means of Ascertaining and Registering the Linear Measure of Packaged Fabrics; and that the following is a description thereof, reference being had to the accompanying drawing, in which—

Figure 1:
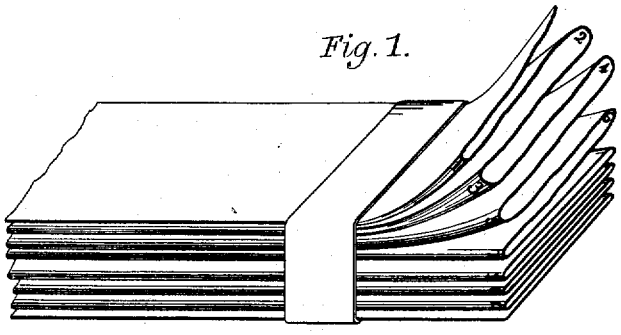
Figure 2:
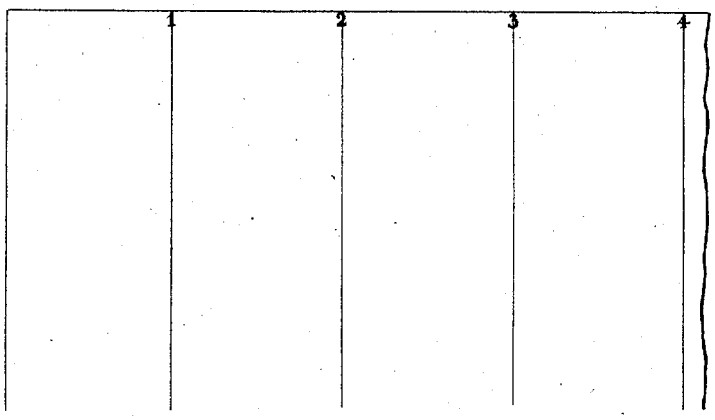

Figure 1 represents, in perspective, a package of folded cloth, with a portion of its folds partially opened and turned up, to show more clearly the graduation and notation by which its linear measure is shown; and Fig. 2 represents, in plan, the back of a piece of graduated cloth, unfolded and spread out, to show its graduation into units of equal length by lines, in this example, running across the web; to indicate, also, the places for the folding, or the severance of the piece parallel to its ends.

The numerals at the edge of the web, on the graduation-lines, indicate the units of the graduation.

The principal object of my invention is to dispense with the use of accessory measuring instruments in ascertaining the linear dimensions of that class of fabrics which are manufactured in webs, and wound, rolled, or folded in packaging them for storage or sale; and I accomplish this object by so preparing and putting up the fabric that, after the package is complete, there will always be marks or symbols on the outer end of the goods, to indicate its linear dimensions, whether the package remains unbroken or it has been opened and a portion has been severed from its outer end; and my invention consists in graduating the fabric into units of equal length, (and subdividing these units when expedient,) and numbering consecutively such units by suitable symbols of notation, such graduation and notation to begin at that end of the goods which is to be placed at the inner or initial part of the package, and to be regularly continued to the opposite end, which will be the terminal end of the scroll, at the outside of the package, and the first to be cut off for use or sale.

The graduation and notation marks may be made by imprinting, stamping, or otherwise, as may be most suitable or convenient, upon the fabric, so that the terminal notation and graduation will always be the true register of the linear quantity of goods in the package, while the graduation and notation on any portion of the goods severed from the package will, by mere inspection and counting or computation, and without resort to comparison with an accessory measure, show the length of such severed portion.

The unit of measure shown by the graduation-lines and numerals in the accompanying drawing is a yard, on a reduced scale. The package represented in perspective by Fig. 1 is a rectangular prism, formed by arranging the goods in superposed folds, each a yard long, and binding the folds so arranged with a band in the usual manner, the initial fold, graduation, and notation being, as the package lies, at its upper side.

If the goods were packaged by winding the cloth in a scroll to form a roll, or around a board to form a bolt, instead of the four-sided prism shown in Fig. 1, the initial graduation and notation and inner end of the web would be at the middle of the roll or axis of the scroll, and the terminal graduation and notation and the outer end of the piece would be at the surface of the roll.

The extension of the graduation-lines of the unit of measure across the web, as shown in Fig. 2, not only indicates the position of the folds necessary to make an even and symmetrical rectangular package, but also serves as a guide for the severance of the piece at right angles to its length, thus avoiding the cutting of skew or biased ends, which, although so wasteful, could hardly be avoided heretofore in cutting plain cloths, in which the line of the weft-thread could not readily be seen.

The graduation and notation marks may be printed upon the goods by modifying any of the machines in use for measuring the length of a web of cloth, so as to subdivide it into uniform units, and combining with the measuring apparatus a series of suitable types, fitted with inking apparatus, for imprinting upon the goods symbols to denote the units and notation simultaneously with their admeasurement. As such measuring and printing mechanism are not herein claimed, a description thereof in this specification would be superfluous. The ink or pigment employed for marking the graduation and notation and making the cutting or folding lines may either be paints or fast colors, or a colored starch, paste, or mucilage, readily soluble in water, so that the marks would disappear upon the fabric being washed, the ink or pigment to be selected which, in each case, is deemed best suited to the wants of those who buy the cloth.

It is obvious that suitable symbols of the graduation or notation might be made in many different ways, and attached to the fabric by various means well known in the arts, so as to produce the accurate self-measurement and graduation of the cloth and the self-registry of its own length in a package, which my invention contemplates.

When a portion of the goods is to be severed from the package it must always be taken from that end of the fabric at which the graduation and notation terminate, for, then, the quantity left in the package will be correctly registered by the terminal notation and graduation.

In graduating coarse and cheap goods it might not be advisable to subdivide the units of measure, whether meters, yards, or feet, as the fraction of a unit of measure of such goods could be estimated with sufficient nearness by the eye; but for fine or costly goods it would be expedient to subdivide the units into halves, quarters, eighths, and in some cases down to much smaller parts of a unit. This would easily be done by providing appropriate supplemental types in the measuring and printing machinery, or suitable symbols stamped or otherwise made, and attached by any suitable means.

The automatic measurement of goods not only saves the labor, but also avoids the mistakes and the not uncommon fraud, of manual measuring; and the self-registry of the quantity in every package, whether broken or unbroken, among other advantages, greatly facilitates the making out of inventories, by saving the time and labor involved in unrolling, measuring, and rerolling cut packages, and uncut ones which have lost their measure tags or marks.

Attempts have been made to obtain these results by folding or winding up graduated and notated paper measures with the fabric; but this plan has failed, from the fact that the measure and fabric were coiled in separate and independent spirals, which, although starting from a common axis, after leaving it have no common point of meeting for their equal units of length. On the contrary, the terminals of those units progressively recede from each other as the roll increases, because the fabric and measure wind round the axis in their respective paths with unequal linear progression, so that if, for example, a fifty-yard graduated paper-strip measure were wound up with fifty yards of carpet into a roll, both commencing with their initial ends together, and wound up in close contact, their terminal ends, at the outside of the roll, would be many feet apart, so that if the cloth were severed transversely into pieces at the points where the graduation yard-marks of the paper come into contact with it, the pieces of cloth so severed would neither be in yard-lengths, nor would the notation on the graduated paper at any line of severance be a register of the true length of the cloth remaining in the package.

This mode of measuring fails, because of the geometrical incompatibility of the curves of the accessory paper measure and those of the cloth.

The defects of the measuring-strip are all avoided by my method of dispensing with this and all other accessory measures, by making the packaged fabric itself the graduated measure of its own length, and its own register of the units of linear measure which, from time to time, it contains.

What I claim is—

1. The preparation of fabrics for sale and inventory by measuring, graduation, notation, and packaging, substantially as described.

2. In combination with the graduation and notation, transverse guide-lines, to facilitate the folding or severance of the fabric without bias, substantially as described.

SAMUEL C. TALCOTT.

Witnesses:

H. M. TALCOTT,

C. A. HINCKLEY.